United States Patent [19]

Baker et al.

[11] 4,279,487

[45] Jul. 21, 1981

[54] ADAPTER FOR COUPLING A CAMERA TO AN OPTICAL INSTRUMENT

[75] Inventors: Philip G. Baker, Peabody; John K. Fitch, Boston; Henry T. Vance, Jr., Manchester, all of Mass.

[73] Assignee: Polaroid Corporation, Cambridge, Mass.

[21] Appl. No.: 128,140

[22] Filed: Mar. 7, 1980

[51] Int. Cl.³ .................. G03B 7/091; G03B 17/52
[52] U.S. Cl. ................... 354/79; 354/23 D; 354/60 L
[58] Field of Search ................... 354/23 D, 60 L, 79

[56] References Cited

U.S. PATENT DOCUMENTS

| | | | |
|---|---|---|---|
| 2,659,268 | 11/1953 | Grand | 350/18 |
| 3,633,481 | 1/1972 | Kuhl | 354/79 |
| 3,898,678 | 8/1975 | Walworth | 354/79 |
| 3,899,788 | 8/1975 | Toyoda | 354/23 D |
| 3,900,858 | 8/1975 | McCann et al. | 354/79 |
| 3,921,183 | 11/1975 | Toyoda | 354/23 D |
| 3,987,463 | 10/1976 | Nishikawa et al. | 354/50 |
| 3,992,098 | 11/1976 | Wirtz | 355/68 |
| 3,995,284 | 11/1976 | Kitawa et al. | 354/23 D |
| 3,999,195 | 12/1976 | Little | 354/60 L |
| 4,007,469 | 2/1977 | Land et al. | 354/27 |
| 4,021,825 | 5/1977 | McCann et al. | 354/79 |
| 4,174,159 | 11/1979 | Kraft et al. | 354/23 R |
| 4,174,893 | 11/1979 | Burgarella et al. | 354/29 |
| 4,175,843 | 11/1979 | Douglas | 354/31 |
| 4,176,931 | 12/1979 | Taube et al. | 354/79 |

Primary Examiner—Michael L. Gellner
Attorney, Agent, or Firm—John S. Vale

[57] ABSTRACT

An adapter for coupling a camera having automatic exposure control to an optical instrument, such as a microscope, for measuring the intensity level of image forming light emanating from the instrument and storing the measurement data, for evaluating the measured light intensity to see if it is in a predetermined range of exposure values, for automatically actuating the camera if the light intensity level is suitable for proper film exposure and thereafter terminating exposure in accordance with the stored data and for inhibiting camera actuation if the measure intensity level is too high or too low for proper exposure.

17 Claims, 9 Drawing Figures

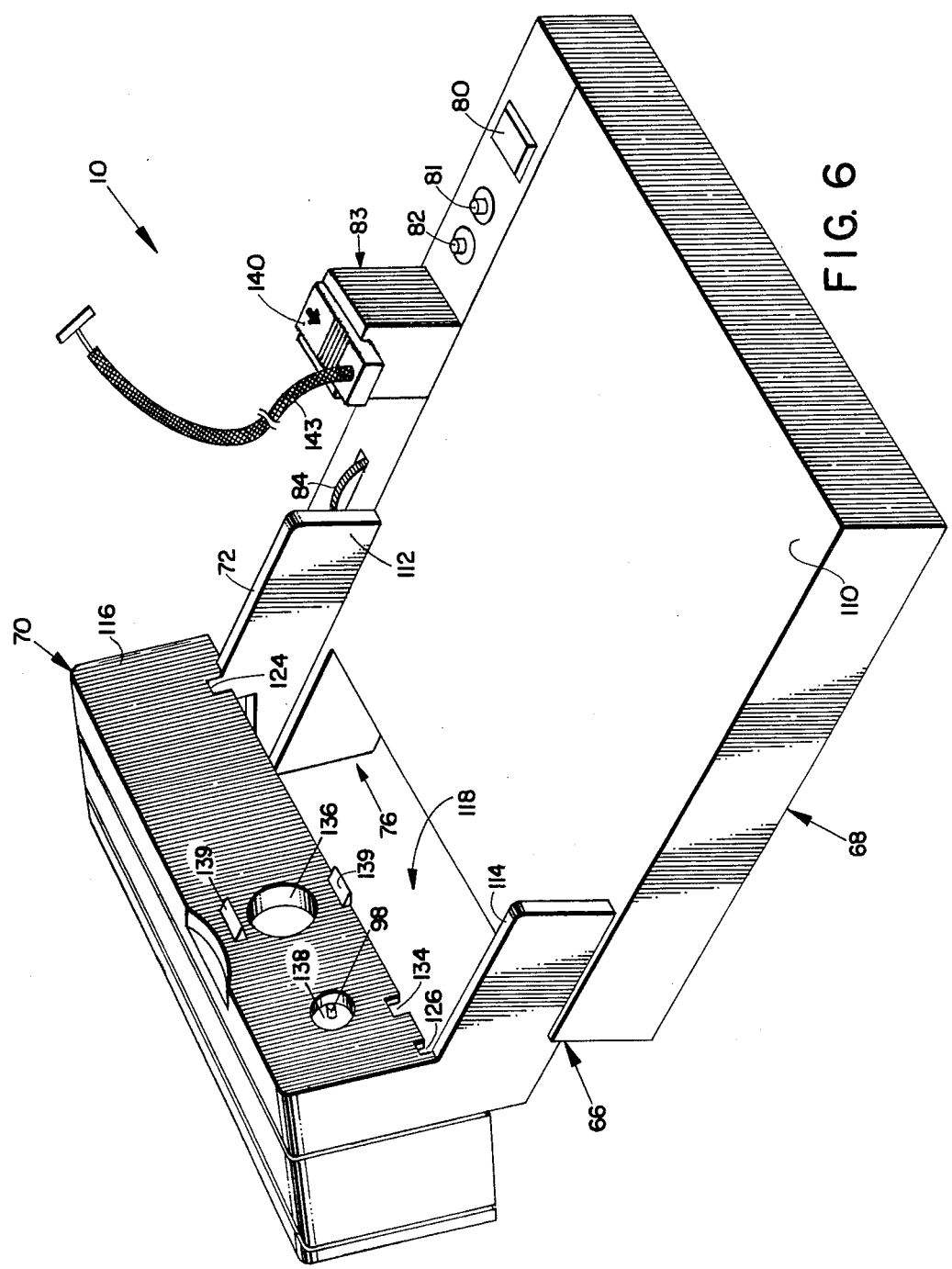
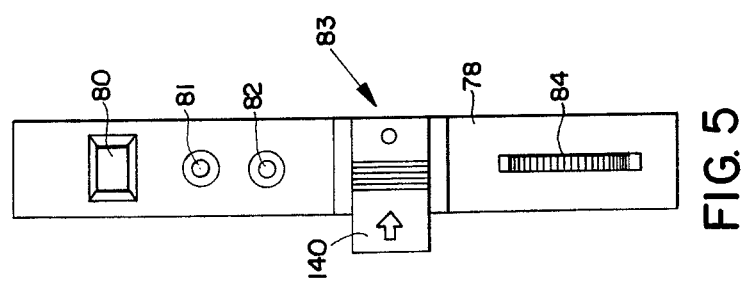

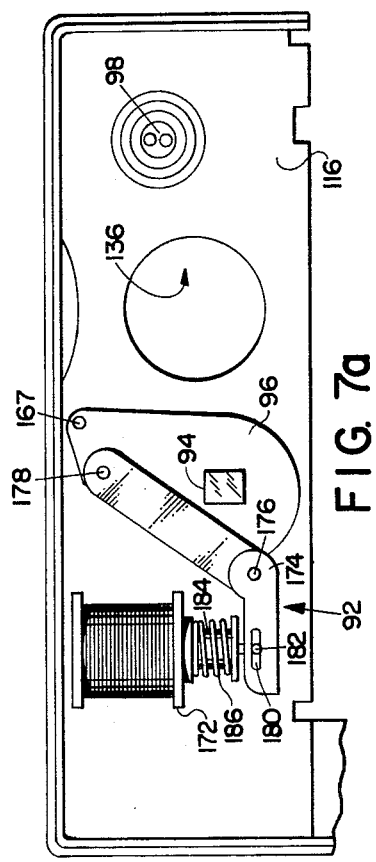
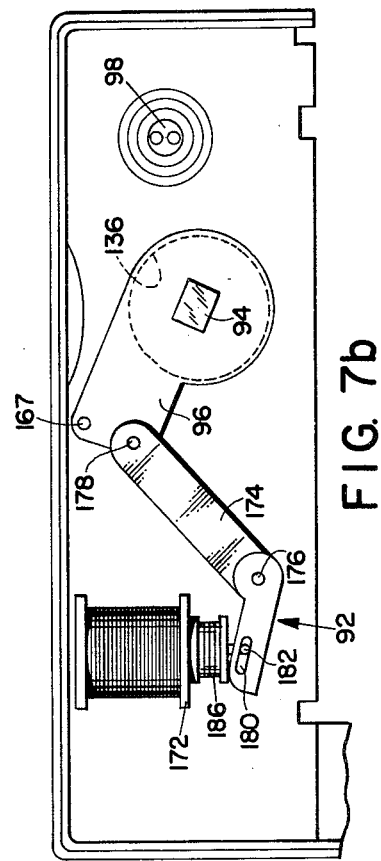
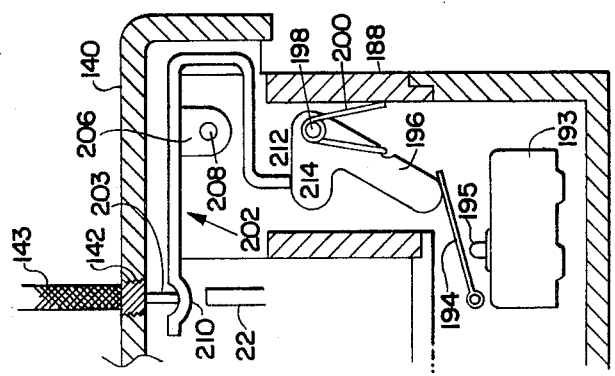

ADAPTER FOR COUPLING A CAMERA TO AN OPTICAL INSTRUMENT

BACKGROUND OF THE INVENTION

The present invention relates to the field of photography and, more specifically, to an adapter for operatively coupling an automatic camera to an optical instrument (such as a microscope, telescope, etc.) in position to photograph an image provided by the instrument.

In a preferred embodiment, the adapter is particularly designed for use with the SX-70 Land camera marketed by Polaroid Corporation, Cambridge, Massachusetts.

The SX-70 is a highly-automated, battery operated, single lens reflex, self-developing camera which upon actuation automatically proceeds through a preprogrammed cycle of operation. The cycle includes a preexposure phase during which the shutter closes and a rather large plate-like reflex member pivots from a viewing position to an exposure position; a film exposure phase wherein the shutter is automatically controlled by a light sensing circuit including a photocell mounted on the front of the camera next to the objective lens for measuring scene light; and a postexposure phase during which the exposed film unit is advanced between a pair of rollers for processing and ejection from the camera, the reflex member is returned to the viewing position, and the shutter is reopened.

Adapters for operatively coupling an SX-70 camera to the eyepiece tube of an optical instrument are known in the prior art. For example, see U.S. Pat. Nos. 3,999,195 and 4,176,931; and commonly-assigned U.S. Pat. Nos. 3,898,678; 3,900,858 and 4,021,825.

The last-mentioned patent recognizes that when the relatively heavy SX-70 camera is mounted on a slender microscope eyepiece tube and the reflex member is rapidly pivoted and then abruptly stopped at the exposure position, vibrations, persisting up to approximately two seconds, may be induced in the system and cause image blur during the film exposure phase.

The adapter disclosed in U.S. Pat. No. 4,021,825 solves this problem by providing an auxiliary capping blade shutter that blocks the camera objective lens prior to the start of the cycle. After cycle initiation and a period allowing the vibrations to subside, the auxiliary shutter is moved to an unblocking position to initiate the film exposure phase. The exposure is controlled by diverting a portion of the image forming light emanating from the microscope eyepiece to the camera mounted photocell with an elongated prism.

In effect, the auxiliary shutter allows the user to override the preprogrammed cycle by inserting a delay between the preexposure and exposure phases.

The adapter also is designed to operate in a manual mode for long, low light level exposures that exceed the camera's automatic cycle limit of approximately 20 seconds. In this mode, the cycle is initiated and then, after the shutter is opened for exposure, a film loading door latch is pivoted causing the battery in the camera to be disconnected from the camera control circuits thereby suspending the automatically controlled exposure phase. Exposure is manually terminated by moving the latch to reconnect the battery and then closing a switch to energize a lamp in front of the camera photocell which causes the shutter to close.

While the above-noted adapter performs well, it does have a limitation. Those skilled in the art of photographing optical instrument provided images will recognize that the light intensity level of these images vary considerably. Factors contributing to such variability include the light transmission or reflection properties of the specimen under observation, the amount of heat the specimen may be subjected to by the instrument's illumination system; the degree of magnification utilized; etc. Because the light intensity level is difficult to judge visually and the adapter does not include any means for measuring light intensity prior to film exposure, it is likely that the user will attempt sme exposures when the image forming light intensity level does not fall within a predetermined range of exposure values compatible with the camera's automatic exposure control system and the resulting print will be either overexposed or underexposed. This wastes film and places the burden on the operator to analyze the poorly exposed print and then estimate how much the illumination must be changed for correction.

Commonly-assigned copending applications U.S. Ser. Nos. 063,043 and 063,254 disclose an adapter for operatively coupling an automatic self-developing camera to an endoscope. The adapter includes a light sensing circuit, operable before camera actuation, for measuring the light output level of the endoscope and storing this information for later use in controlling exposure. Exposure is terminated by energizing a lamp in front of the camera photocell at a time following exposure initiation that is proportional to the stored information. The initial measurement is provided by pivoting a mirror or prism into the light output path ahead of the camera objective lens and diverting a portion of this light to a photocell mounted on the adapter. However, the adapter does not include means for inhibiting exposure if the measured level does not fall within a range that is compatible with the camera and film speed exposure parameters. Again, film may be wasted while the illumination system is experimentally adjusted.

U.S. Pat. No. 3,987,463 discloses a complex special purpose camera assembly and remote control unit designed for use with a microscope. The camera assembly includes a photocell for measuring the light output of the microscope before exposure initiation. If the measured light level is below a predetermined range, an indicator lamp on the control unit is energized to warn the operator. However, such a complex camera and control unit is inherently expensive and does not provide the option for using a relatively low-cost commercially available camera, such as the SX-70, for making properly exposed self-developing prints.

Cameras that include self-contained system for monitoring scene light before exposure initiation and inhibiting initiation of an automatically controlled exposure cycle if the scene light level is too high or too low and also providing a warning indication to the user in the viewfinder are also known in the prior art. For representative examples of such cameras or self-contained systems for use therein, reference may be had to U.S. Pat. No. 3,921,183 and commonly-assigned U.S. Pat. Nos. 4,007,469 and 4,174,893.

It is a principle object of the present invention to provide an adapter that is designed for use with a commercially available camera, such as the SX-70 Land camera, which does not include such a self-contained system and adds the preexposure light measurement and selective camera actuation inhibit function when the adapter embodying the present invention and such a camera are used in combination.

It is another object to provide such adapter which operates in an automatic mode that includes inserting a delay in the camera's preprogrammed cycle to allow vibrations induced by movement of the reflex member to subside before the film exposure phase is initiated.

Another object is to provide such an adapter that is easy to use and economically constructed.

Yet another object is to provide an adapter that is suitable for operatively coupling such a camera to a large variety of optical instruments and has a light measuring system that is accurate over the wide range of image intensity levels generally encountered in photographing images provided by these instruments.

Still another object is to provide such an adapter that is also operable in a manual mode for time exposures in excess of approximately 13 seconds and includes a simply constructed and easy to use manual mode actuating assembly.

Another object is to provide such an adapter that includes visible indicators for indicating when the measured light output level of the instrument is above or below a predetermined range of exposure values.

Other objects of the invention will, in part, be obvious and will, in part, appear hereinafter.

SUMMARY OF THE INVENTION

The present invention provides an adapter for (1) operatively coupling a camera having an automatic exposure control system to an optical instrument for photographing an image provided therefrom; (2) for measuring the intensity level of the image forming light and storing the image level data prior to camera actuation; (3) for evaluating the measured intensity level to find out whether the level is within a predetermined range of exposure values; (4) for providing a signal to trigger camera actuation if the measured level is within the predetermined range; and (5) for inhibiting camera actuation if the measured intensity level is not within the predetermined exposure value range and providing a visual indication to the operator showing there is too little or too much light for proper exposure.

The adapter comprises an adapter body for receiving and supporting such a camera thereon and including structure for coupling the adapter body to the instrument so that the camera's objective lens is in position to receive image forming light transmitted along an optical path from the instrument. The body also includes structure for blocking the transmission of ambient and image forming light to a photocell mounted on the camera and forming part of a light sensing circuit for automatically controlling film exposure. Mounted on the body in front of the photocell is a light source that is operative upon energization for transmitting a sufficient quantity of light to the photocell for the light sensing circuit to provide an exposure termination signal within the camera.

The adapter includes electronic circuitry for measuring the intensity level of the image forming light and for providing a trigger signal at the end of an interval that is proportional to the measured intensity level; means for storing the measured light intensity data; and control means responsive to the trigger signal when provided within a predetermined range of timed intervals that corresponds to the predetermined range of exposure values for actuating the camera and responsive to the storing means for thereafter energizing the light source at the proper time based on the stored data to terminate exposure and also for inhibiting camera actuation when the trigger signal is provided at times not within the predetermined range of timed intervals.

In the illustrated embodiment the control means includes an exposure window timing and gate circuit that effects camera actuation when the trigger signal is received between minimum and maximum predetermined times but inhibits actuation if the trigger signal is received before the minimum time or after the maximum time.

In a preferred embodiment, the adapter also includes means, such as a pair of indicator lamps, for indicating that the measure level is too high or too low thereby alerting the user as to the manner in which the instrument illumination should be changed for proper exposure.

The adapter's light measuring system includes a light sensing circuit formed in part by a photocell that is mounted for movement between an inoperative position where it is located out of the optical path between the instrument eyepiece and the camera lens and an operative position in which it is located within the path for making the intensity level measurement. In a preferred embodiment, the photocell is mounted for movement by a pivoting capping blade shutter that is movable between an unblocking position for unblocking the camera lens and locating the photocell out of the optical path and a blocking position where it blocks the lens and locates the photocell in the optical path.

The capping blade is maintained in its blocking position for a predetermined interval after camera actuation to allow vibrations induced by the movement of the camera reflex member to subside before the shutter is moved to its unblocking position to initiate the exposure phase. Thus, the shutter blade serves two purposes. It moves the photocell thereon between its inoperative and operative positions and also serves to insert a delay into the camera's preprogrammed cycle of operation to allow the reflex member induced vibrations to subside prior to initiating film exposure.

In the illustrated embodiment, the adapter utilizes an up/down counter for storing the image forming light intensity data for later use during the film exposure phase. Because exposure intervals in this type of application tend to be rather long (approximately 100 milliseconds to 12.5 seconds), a dual rate clock is used to operate the counter. This permits the light measuring signals to be counted at a relatively fast rate. During exposure, when the counter is used in its count down mode, the timer rate is switched to real time for making the actual exposure.

The adapter is also designed for use in a manual mode for making long time exposures (in excess of approximately 13 seconds) and includes a mechanical cable release operated actuator for sequentially actuating the camera and then pivoting the camera door latch to suspend the camera's automatic preprogrammed cycle for extended exposures. Upon release, the process is reversed to reconnect the battery and then energize a light in front of the camera photocell to effect shutter closure or exposure termination.

BRIEF DESCRIPTION OF THE DRAWINGS

For a fuller understanding of the nature and objects of the invention, reference should be had to the following detailed description taken in connection with the accompanying drawings wherein.

FIG. 5 is an enlarged plan view of the adapter's control panel shown in FIG. 4;

FIG. 6 is a rear perspective view of the adapter;

FIG. 7A is a front elevational view of a panel within the adapter mounting a solenoid operated auxiliary shutter having a photocell thereon and also mounting a light source in front of the camera's photocell to trigger exposure termination;

FIG. 7B is similar in some respects to FIG. 7A but shows the shutter blade in a light blocking position; and FIG. 8 is a cross-sectional view of a manual mode switching device shown in operative relation with the door latch actuator on the camera.

DESCRIPTION OF THE PREFERRED EMBODIMENT

Figure 1:
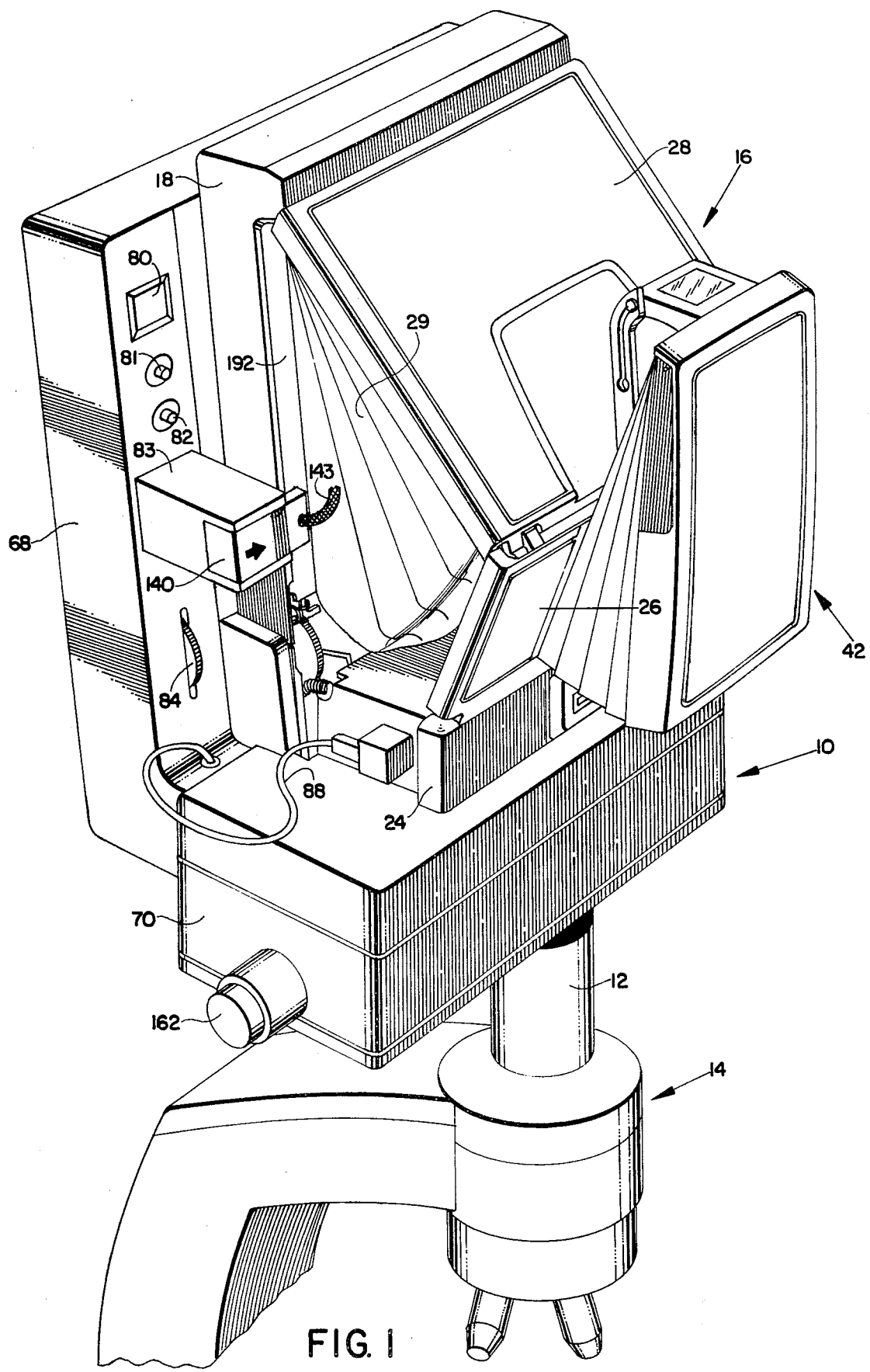
FIG. 1 is a perspective view of a self-developing single lens reflex camera supported in operative relation with the eyepiece lens of a microscope by an adapter embodying the present invention.

An adapter 10, embodying the novel features of the present invention, is shown in FIG. 1 mounted on an eyepiece tube 12 of a microscope 14 and supporting an SX-70 Land Camera 16 in operative relation with the eyepiece lens (not shown) of microscope 14.

While the illustrated adapter 10 has been specifically designed for use with the SX-70 Land Camera 16, it should be understood that the inventive concepts to be described in detail hereinafter will apply to other camera and adapter combinations as well as to those specific examples set forth in this disclosure.

In order to understand the operation and construction of adapter 10, it will be helpful, at this point, to provide a brief description of the illustrated camera 16.

Camera 16 may be characterized as a compact, folding, battery-operated, highly-automated, single lens reflex camera of the self-developing type.

Figure 2:
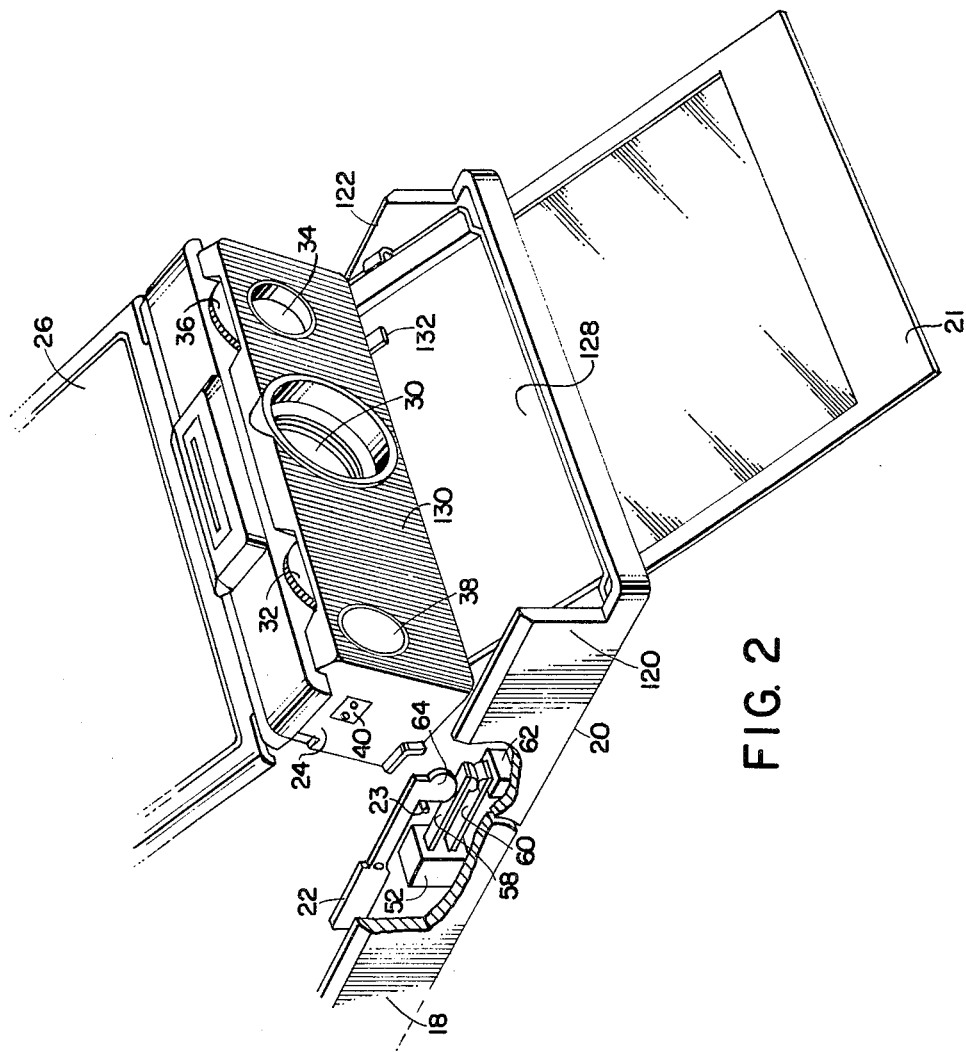
FIG. 2 is a perspective view, partly in section, of the forward portion of the camera shown in FIG. 1 showing the details of a door latch switch which may be actuated by a mechanism on the adapter for disconnecting a battery located in the camera from a camera control circuit.

As best shown in FIGS. 1 and 2, it includes a base housing section 18 for receiving a film container (not shown) holding a plurality of self-developing film units and, preferably, a flat battery for operating the electronic circuits of camera 16. For an example of a film container suitable for use in camera 16, reference may be had to commonly-assigned U.S. Pat. No. 3,779,770 issued on Dec. 18, 1973.

Extending forwardly of housing section 18 is a pivotally coupled housing section 20 mounting a pair of motor driven pressure-applying rollers (not shown) for advancing an exposed integral type self-developing film unit 21 relative thereto and through a film withdrawal slot on the underside forward end of housing section 20 while progressively applying a compressive pressure along the length of film unit 21 to distribute a fluid processing composition between predetermined layers of the film unit thereby initiating a well-known development and diffusion transfer process. For an example of such an integral film unit, reference may be had to commonly-assigned U.S. Pat. No. 3,415,644 issued on Dec. 10, 1968.

Housing section 20 also serves as a film container loading door and is held in the closed position of FIG. 2 by a latch member 22 pivotally mounted on housing section 18 and being configured at its forward end for capturing a latch pin 23 on housing section 20. To load a film container into base section 18, latch member 22 is manually pivoted (counterclockwise as viewed in FIG. 2) to an unlatching position where it releases pin 23 thereby allowing housing section 20 to pivot downwardly to provide access to the open end of a film container receiving chamber in housing section 18.

Positioned over housing section 18 are three pivotally interconnected housing sections 24, 26 and 28; and a light excluding bellows 29.

Housing section 24 mounts an adjustable focus objective lens 30 which may be axially displaced by means of a coupled focusing wheel 32. To the right of lens 30 is a photocell window 34 providing access for light transmission to a camera mounted photocell within housing section 24. As will be described later, the photocell forms part of a light sensing circuit for automatically controlling film exposure. Positioned between the window 34 and the photocell is a variable density filter which may be adjustably positioned by means of a coupled filter wheel 36. Also mounted on housing section 24 is a camera cycle start button 38 and a cable release socket 40 for accepting an electrical switch actuated cable release.

An electronically controlled, two-bladed, variable aperture shutter is positioned behind the objective lens 30 and is normally in its open or light unblocking position for viewing and focusing. In the viewing and focusing mode, light rays passing through lens 30 impinge upon an inclined mirror mounted on the interior surface of housing section 28. The mirror reflects the light downwardly toward the exposure plane which is in coincidence with the forwardmost film unit in the film container held in the receiving chamber of housing section 18. In the viewing and focusing mode, however, the forwardmost film unit is covered by a plate-like reflex member having a Fresnel-type viewing screen facing upwardly on the top side thereof and a mirror on the underside facing the forwardmost film unit. Light rays reflected from the mirror on the interior of housing section 28 form an image of the scene to be photographed on the viewing screen. The viewing screen is reflective and directs light rays emanating from the image back to the mirror on the interior of housing section 28 and through an aperture in housing section 26 to a viewing device 42 mounted thereon. A front mirror in the viewing device 42 forms a second image of the scene which may be observed through an eyelens at the rear of device 42.

In the normal use of camera 16, the user observes the scene or object to be photographed through viewing device 42 and adjusts objective lens 30 by means of focusing wheel 32 for sharp focus. To initiate a cycle of operation, the user actuates the camera start button 38 which closes a switch S1-A (see FIG. 3) to connect a battery 44 in the film container to a camera power and logic circuit 46. Circuit 46 is in turn connected to an automatic exposure control circuit 48 which includes a light sensing subcircuit of which the photocell is a part.

Once the power and logic circuit 46 is energized, camera 16 automatically proceeds through a preprogrammed cycle of operation. The normally open shutter closes and the reflex member is rapidly pivoted upwardly and is abruptly stopped in adjacent parallel relation to the inclined mirror on the interior surface of housing section 28 thereby uncovering the forwardmost film unit and positioning the mirror on the underside of the reflex member in alignment with the objective lens 30. The seating of the reflex member at the exposure position signals the end of a preexposure phase and the initiation of a film exposure phase under the control of the exposure control circuit 48.

The exposure phase begins with the opening of the electronically controlled shutter. The length of the exposure interval, up to a preprogrammed limit of approximately 20-seconds, is determined by the light sensing circuit which is of the integrating type and provides a trigger signal for electronically closing the shutter when a predetermined amount of light has impinged upon the photocell. In response to the trigger signal, the shutter is moved to its light blocking position thereby terminating the exposure interval.

The power and logic circuit 46 then proceeds through a post exposure mode of operation. During this phase, a film advancing device advances the exposed forwardmost film unit from the film container into the bite of the pressure applying rollers. The rollers are driven in a direction to cause the film unit 21 to advance therethrough and out of the exit slot as shown in FIG. 2. While the film unit 21 is being so advanced, the reflex member is driven back to its viewing and focusing position, thereby light sealing the next film unit and the container, and the power and logic circuit 46 causes the shutter to reopen. At this point, all of the subsystems within the camera have been reset for the next cycle of operation and the automatic cycle is terminated.

Figure 3:
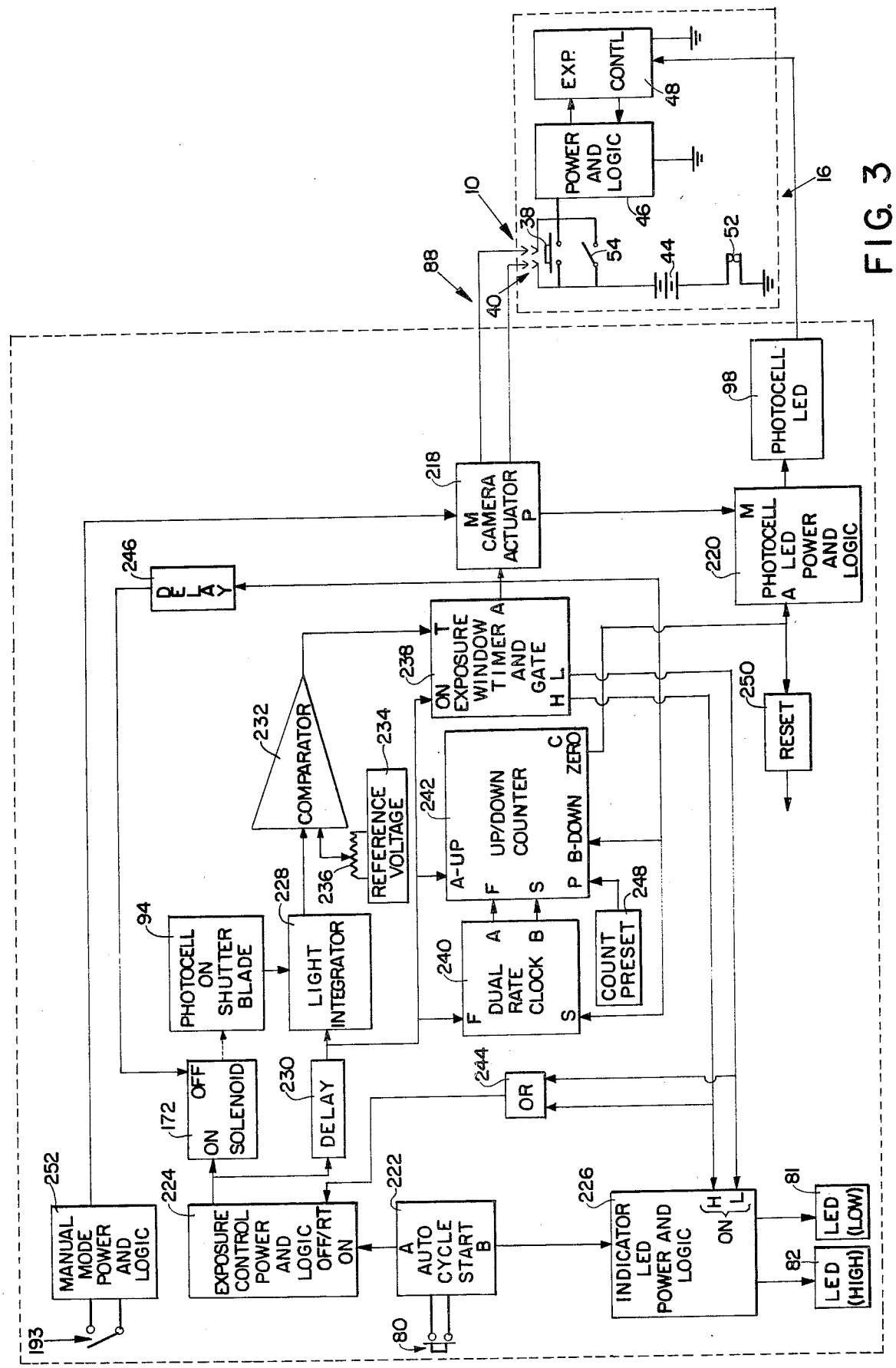
FIG. 3 is a functional block diagram showing how the adapter and camera interact in various modes of operation

From the diagram in FIG. 3, it will be seen that the cable release socket 40 is adapted to receive a plug in cable assembly that also includes a remote actuator electrical switch which is connected in parallel to the camera start switch S1-A when the assembly is plugged into socket 40.

When a film container is initially loaded into the receiving chamber of camera 16, the forwardmost film unit is protected by a cardboard dark slide which must be ejected before the first film exposure can be made. Therefore, camera 16 is also preprogrammed for a dark slide eject mode of operation. As best shown in FIG. 3, there is an electrical switch 52 connected in series with battery 44. Also, there is an electrical switch 54 connected in parallel with the camera start switch S1-A between battery 44 and circuit 46. If both switches 52 and 54 are closed (in a conducting state), camera 16 will proceed through its automatic cycle of operation.

Switch 52 is a sensing device which is closed only when housing section 20 is in its closed position and latch member 22 is in its latching position. Switch 54 is also a sensing device that is actuated by a film counting member (not shown) within camera 16. It is located in its conducting state only when the film counting device returns to a starting position indicating that the film container receiving chamber is empty.

As best shown in FIG. 2, switch 52 is mounted on housing section 18 and includes a pair of spaced leaf-spring-type contact arms 58 and 60 having contact terminals on the free ends thereof. Contact arms 58 and 60 extend across the interface of housing sections 18 and 20. In a nonstressed condition, the contact arms 58 and 60 space the contact terminals away from the conducting position shown in FIG. 1. In order to bring these contact terminals into the conduction position, a cam 62 is provided on housing section 20 such that it engages and urges the lower contact arm 60 upwardly when housing section 20 is in its fully enclosed position. However, this engagement alone is not enough to bring the two contact terminals to the conducting state. For this to happen, the upper contact arm 58 must be urged downwardly. This is accomplished by a cam member 64 positioned on the latching end of the pivotally mounted latch member 22. Cam member 64 will only provide the downward bias on contact arm 58 when the latch member 22 is in its latching position.

To load a new film container into camera 16, the user unlatches housing section 20 causing it to pivot downwardly and provide access to the film receiving chamber. This causes switch 52 to assume its nonconducting or open condition. If the film container receiving chamber is empty, switch 54 is automatically located in its conducting state. If there is an empty film container in the chamber, its removal causes the film counter to move to its starting position thereby switching switch 54 from its nonconducting to its conducting state. When the new film container is loaded into the chamber, switch 54 remains in its conducting state. Upon the closing and latching of housing section 20, switch 52 is closed thereby completing the circuit to initiate the dark slide eject mode of operation. The camera 16 proceeds through a normal cycle of operation and the dark slide is advanced from the film container, between the rollers, and out through the film exit slot in the same manner as a film unit. During this first cycle of operation, the film counting device indexes one position thereby causing switch 54 to move to its nonconducting state. Camera 16 is then ready for a film exposure cycle of operation initiated by the closing of switch S1-A or an auxiliary switch plugged into the cable release socket 40. From FIG. 3, one skilled in the art will appreciate that the automatic cycle of operation may be suspended at some point during the cycle by switching switch 52 to its nonconducting state to disconnect battery 44 from the circuits 46 and 48. Also, it has been shown that the movement of the latch member 22 from its latching position to its unlatching position will cause switch 52 to open. As will be apparent later, adapter 10 includes a device for operating latch member 22 to initiate a manually controlled time exposure for use when the light output of the microscope 14 is very low.

For more detailed descriptions of the structure and operation of camera 16, reference may be had to commonly-assigned U.S. Pat. Nos. 3,714,879 issued Feb. 6, 1973; 3,750,551 issued Aug. 7, 1973; and 3,774,516 issued Nov. 27, 1973.

The adapter 10 embodying the present invention is a simply constructed, compact, electrically operated device for coupling camera 16 to microscope 14 in position to photograph an image provided by microscope 14. If the image forming light emitted by microscope 14 is within a predetermined range of exposure values that is compatible with the speed of the film being used and the automatic exposure control program of camera 16, then adapter 10 operates in an automatic mode. In the illustrated embodiment, adapter 10 is designed to operate automatically when the image forming light is of an intensity level that will require the camera shutter to operate in a range of approximately 100 milliseconds to 12.5 seconds. If the light level is higher, adapter 10 will inhibit operation of camera 16 and provide the user with a visual signal (lighted indicator lamp) to reduce the intensity of the light emitted from microscope 14. Also if the intensity or the image forming light is too low to produce an exposure within 12.5 seconds, camera operation will be automatically inhibited and the energization of a second indicator lamp will warn the user to switch to a manual mode of operation for exposures in excess of 12.5 seconds.

In the automatic mode of operation, an auxiliary shutter blocks the light path to the camera lens and measures the intensity level of the image forming light and stores this information for later use during the film exposure phase. While the optical path to the camera lens is still blocked, the camera is actuated causing the reflex member to pivot to its exposure position and allowing the shutter to open to full aperture. After a suitable delay sufficient to allow the vibrations induced by the movement of the reflex member to subside, the light path is unblocked to begin the film exposure phase. The exposure is terminated by energizing a lamp mounted on the adapter in front of the camera's photocell at a time that is proportional to the measured intensity level utilizing the stored data. The camera then automatically proceeds through the film processing phase to complete its automatic cycle of camera operation.

In the manual mode, the operator actuates a later-to-be-described switching device which sequentially actuates camera 16 and then depresses the latching lever 22 to disconnect the battery 44 from the camera circuit 46 to interrupt the automatic cycle of operation during the film exposure phase. After a manually timed interval that is proportional to the low level of light being emitted from microscope 14, the user manually shuts off the switching device which causes the battery 44 to be reconnected and the lamp in front of the camera's photocell to be energized to provide the appropriate exposure termination signal. Again, the camera proceeds through the film processing phase to complete the cycle of operation.

As best shown in FIGS. 1, 4, 5 and 6, adapter 10 comprises an adapter body 66 defined by a first or base housing section 68 and a second housing section 70 spaced forwardly of and above the leading end of housing section 68 by a pair of laterally spaced support arms 70 and 72.

Figure 4:
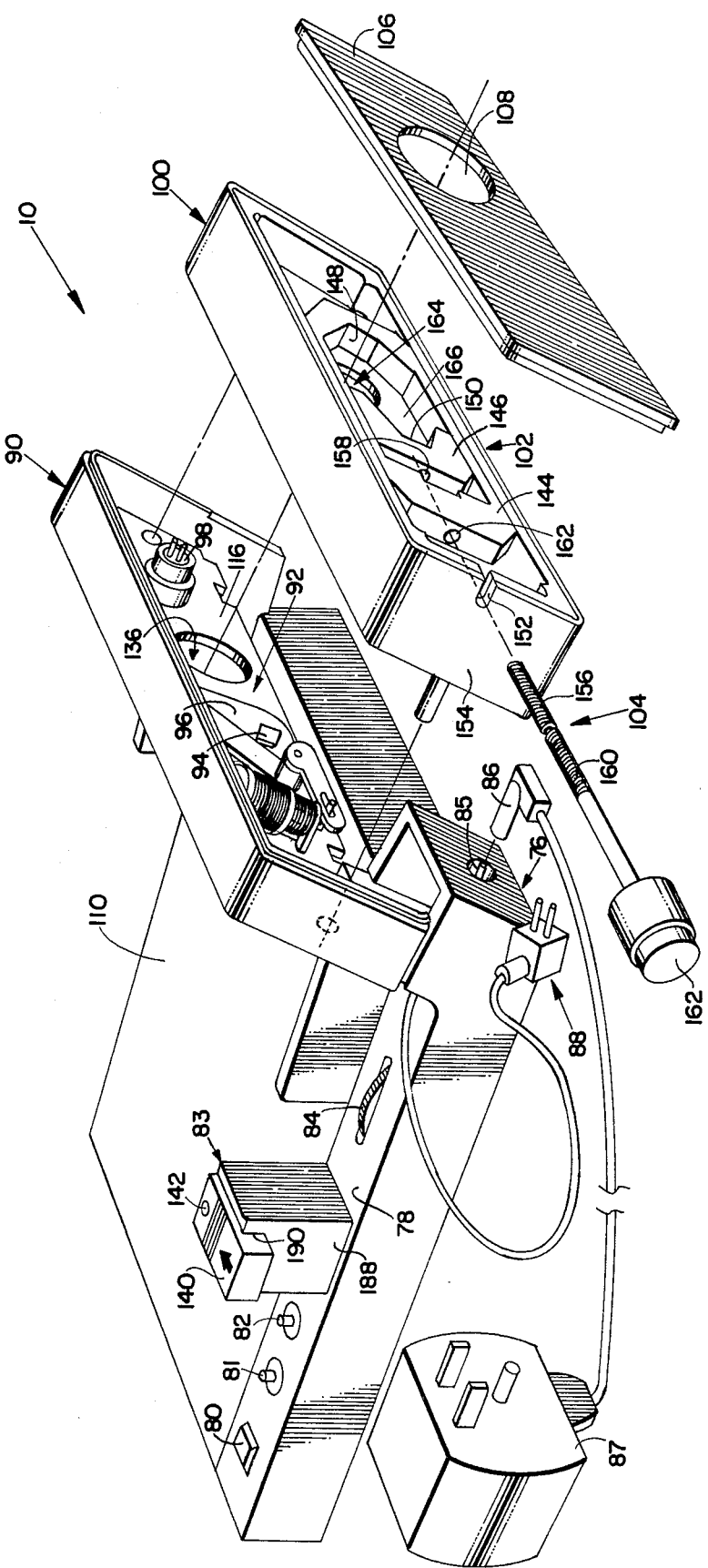
FIG. 4 is an exploded perspective view of the adapter embodying the present invention.

The base section 68 is a generally box-like structure having an integrally formed forward extension 76 along its right-hand side (as viewed in FIGS. 4 and 6).

Functionally, housing section 68 serves to enclose a plurality of later-to-be-described adapter operating circuits; to mount support arms 72 and 74; to cooperate with arms 72 and 74 and a portion of housing 70 to define means for receiving and supporting camera 16 at an operative position thereon; to mount a control panel 78 including thereon an automatic cycle start button 80, a first indicator lamp (LED) 81 for indicating that the intensity of the image forming light is too low for automatic exposure, a second indicator lamp (LED) 82 for indicating the intensity of the image forming light is too high for automatic exposure, a manual mode switching device 83, and an exposure trim wheel 84 for selectively adjusting the response of the adapter's automatic exposure control system; and to mount a power cable receiving socket 85 at the forward end of housing portion 76 for receiving the terminal plug 86 of a transformer voltage step-down assembly 87 that is plugged into a conventional wall circuit to supply low voltage power to the adapter's operating circuits within housing section 68. Housing section 68 also mounts an electronic switch actuated cable release assembly 88 that plugs into camera socket 40.

The second housing 70 comprises a rear portion 90 for mounting a solenoid operated shutter 92 having a forwardly facing photocell or photodiode 94 on a shutter blade 96 and a lamp or LED 98 for transmitting light to the camera's photocell to terminate exposure; a middle portion 100 for mounting a vice-like clamp assembly 102 and a clamp adjusting lead screw assembly 104 that are operative to releasably couple adapter 10 to the eyepiece tube 12 of microscope 14; and a front cover plate 106 for covering the front of middle portion 100 and having an access opening 108 therein through which the eyepiece tube extends into clamping device 102.

With reference to FIGS. 1 and 4, adapter 10 includes means for releasably receiving and supporting camera 16 at an operative position thereon. The receiving and supporting means includes a longitudinally extending major portion of a top wall 110 of housing section 68 bounded along one edge by control panel 78 and extending forwardly between the support arms 72 and 74; the interior facing surfaces 112 and 114 of support arms 72 and 74, respectively; and the exterior rearwardly facing surface of a rear wall 116 on the rear portion 90 of housing section 70.

As best shown in FIG. 6, support arms 72 and 74 locate the rear portion 90 of housing section 70 above and forwardly of the forward end of top wall 110 to define an opening 118 therebetween into which the forward portion of camera housing section 20 is slidably inserted to releasably couple camera 16 to adapter body 66. The interior surfaces 112 and 114 are spaced apart a distance that allows the upstanding side walls 120 and 122 of camera housing section 20 (see FIG. 2) to slide therebetween. Also, corresponding notches 124 and 126 are provided in a bottom portion of wall 116 adjacent surfaces 112 and 114, respectively, to allow the top forward edges of side walls 120 and 122 to pass therethrough into the interior of rear housing section 90. As best shown in FIG. 2, a folding inclined baffle plate 128 on housing section 20 extends forwardly of the forward wall 130 of camera housing section 24 and includes a tab 132 thereon adjacent the bottom of lens 30 which projects forwardly of surface 130 and is engaged thereby when the camera is folded to pivot baffle plate 128 downwardly to its folded position. A notch 134 is provided along the bottom edge of wall 116 adjacent to notch 126 to accommodate tab 132 so that the forwardly facing surface 130 of camera housing section 24 may rest against the rearwardly facing surface of wall 116.

When camera 16 is operatively supported in adapter 10, the bottom wall of camera housing section 18 and a portion of the bottom wall of camera housing section 20 adjacent thereto rests on and are supported by the top wall 110 of adapter housing section 68. The forward portion of housing section 20 extends into opening 118 thereby locating the film exit slot at the forward end of housing section 20 to extend beyond the leading edge of top wall 110 to provide clearance for the film unit 21 to be ejected from the camera and passed to the exterior of the adapter through opening 118. As will become apparent later, it is important to support housing section 20 in this manner so that it may be unlatched by pivoting latch member 22 to its unlatching position (to disconnect battery 44 for manual mode operation) without allowing housing section 20 to inadvertently pivot away from its operative closed position.

The longitudinal placement of camera 16 within adapter body 66 is controlled by the abutment of the forward wall 130 of camera housing section 24 against the exterior surface of adapter wall 116.

As best shown in FIG. 6, wall 116 is provided with a lens opening 136 (in alignment with opening 108) through which image forming light from microscope 14 may be selectively transmitted to camera lens 30 and a second opening 138 that is aligned with the camera photocell window 34 and in which the photocell trigger LED 98 is located to transmit light to the camera's photocell when LED 98 is energized. Optional ramped projections or stop 139 may be provided above and below opening 136 for engaging a bezel around lens 30 to accurately align lens 30 with opening 136.

As best shown in FIGS. 1 and 6, the manual mode switching device 83 is positioned on control panel 78 adjacent to latch lever 22 on camera housing section 18 when camera 16 is operatively located in adapter 10. As will be described later, device 83 includes a laterally movable actuator cap 140 thereon having a threaded opening 142 near its interior end for receiving a conventional mechanical cable release assembly 143 (partially shown) for actuating lever 22 and a later-to-be-described switch.

With reference to FIG. 4, the earlier noted means for coupling adapter 10 to the eyepiece tube 12 of microscope 14 includes the clamp assembly 102 and the lead screw assembly 104 mounted on the middle portion 100 of housing section 70.

Clamp assembly 102 comprises a first generally rectangular clamp member 144 mounted for lateral sliding movement within a receiving frame formed in middle portion 100 and a second clamp member 146 mounted within clamp member 144 for lateral sliding movement relative thereto. Member 144 includes a generally V-shaped notch 148 for engaging one side of eyepiece tube 12 and clamp member 146 includes a corresponding, oppositely-facing V-shaped notch 150 thereon for engaging the opposite side of tube 12. Clamp members 144 and 146 are adapted to be simultaneously driven in opposite directions by the lead screw member 104 which extends into middle portion 100 through an access slot 152 in a side wall 154 and includes a right-hand threaded portion 156 that is received in a corresponding threaded hole 158 in clamp member 146 and a left-hand threaded portion 160 that is received in a complementary-threaded hole 162 in clamp member 144. Secured to the outer end of assembly 104 is an adjustment knob 162 which extends outwardly beyond side wall 154.

In operation, the user rotates assembly 104 in a direction to cause the threaded portions 156 and 160 to effect opposite movement of clamp members 146 and 144 away from each other. He then positions adapter 10 over the eyepiece tube 12 of microscope 14 such that tube 12 extends through opening 108 and between the V-shaped clamp members 148 and 150 so that the eyelens on the end of tube 12 is adjacent to and is aligned with an opening 164 in a rear wall 166 of middle portion 100. Knob 162 is then rotated in the opposite direction to drive clamp members 146 and 144 closer together so that the clamp sections 148 and 150 frictionally engage the opposite sides of lens tube 12 or the exterior casing of the eyepiece. It will be noted that openings 108, 164 and 136 are axially aligned so that the eyelens of the microscope is in optical alignment with the camera lens 30.

The adjustability of clamp assembly 102 provides adapter 10 with some degree of versatility in that it may be adjusted to accommodate a fairly large range of eyepieces and/or eyepiece tube diameters found on different microscopes or other optical instruments. For a more detailed description of the clamp assembly, reference may be had to the earlier noted commonly assigned U.S. Pat. No. 4,021,825.

As noted earlier, adapter 10 includes a solenoid operated shutter 92 mounted in the rear portion 90 of housing section 70.

As best shown in FIGS. 7a and 7b, shutter 92 includes the shutter blade 96 having the photocell 94 mounted thereon. The shutter blade 96 is pivotally coupled at its upper end at pin 167 to wall 116 for pivotal movement between the unblocking position of FIG. 7a where it is out of the optical path along which image forming light is transmitted to lens 30 through aperture 136 and the blocking position of FIG. 7b where the bottom portion of shutter blade 96 covers aperture 136.

The means for pivoting blade 96 between its unblocking and blocking positions includes a solenoid 172 and a generally L-shaped inwardly offset blade operating link 174.

Link 174 is pivotally coupled to wall 116 at an intermediate portion by pivot pin 176. The upper end of link 174 is pivotally connected to shutter blade 96 by a pivot pin 178 which extends into a blade slot (not shown) spaced to the left of pivot pin 166. The opposite end of link 174 is connected to solenoid 172 by a horizontal slot 180 in link 174 that captures an L-shaped pin 182 projecting downwardly from a solenoid plunger 184. The solenoid 172 is fixedly mounted on wall 116 and in its unenergized state, the plunger 184 is maintained in its extended position by a plunger biasing spring 186.

As best shown in FIG. 7b, when solenoid 172 is energized, plunger 184 retracts causing pin 182 thereon to rotate link 174 in a clockwise direction about pin 176. In response to this rotation, the upper end of the link moves downwardly with respect to pin 166 and causes the shutter blade 96 to pivot in a counterclockwise direction thereabout to its blocking position. As long as solenoid 172 is maintained in its energized state, the shutter blade 96 will remain in the blocking position. Upon the deenergization of solenoid 172, spring 186 causes plunger 184 to move downwardly to its extended position thereby pivoting link 174 in a counterclockwise direction which causes the shutter blade 96 to pivot in a clockwise direction back to its unblocking position of FIG. 7a. When shutter blade 96 is closed, the photocell 94 thereon, forming a portion of a later-to-be-described adapter light sensing circuit, is centered in the optical path to lens 30 along which image forming light is transmitted from microscope 14.

When camera 16 is operatively positioned in adapter 10, the camera photocell window 34 engages the back surface of wall 116 in alignment with the photocell LED 98. By being so positioned, the adapter housing 70 serves as means for blocking the transmission of both ambient and scene light to the camera mounted photocell window 34. Also, the only light transmission path for both ambient and scene light to the camera lens 30 is through the three aligned adapter openings 108, 164, and 136. When shutter blade 96 is in its closed position, adapter 10 is configured to block transmission of both ambient and image forming light to objective lens 30.

The manual mode switch device 83 will now be described with reference to FIGS. 1, 4, 6 and 8. Switching device 83 includes a hollow parallelepiped-shaped base or pedestal 188 mounted on control panel 78 and including a laterally extending channel 190 at its upper end for slidably receiving and supporting the movable actuator cap 140 thereon for movement between an inoperative retracted position, shown in FIG. 4, where the interior end of cap 140 is set back from the path of travel of the side wall of camera base section 18 and a longitudinally extending cap 192 thereover having an opening therein for providing access to the latch level 22 so as to facilitate the insertion/withdrawal of camera 16 into and out of adapter body 66 and an extended operative position (shown in FIGS. 1, 6 and 8) where the interior end of cap 140 extends over the longitudinal cap 192 to locate the threaded hole 142 for receiving the mechanical cable release assembly 143 over the end of latch lever 22.

As best shown in FIG. 8, the open bottom of pedestal 188 provides communication with the portion of housing section 68 therebelow and its open top end provides communication with the interior of the hollow actuator cap 140.

Mounted in housing 68 below pedestal 188 is a normally open microswitch 193 that may be switched to its closed or conducting state by pivoting its actuator arm 194 downwardly to depress switch button 195. The free end of arm 194 is aligned with the center of pedestal 188 and is operated by a generally L-shaped actuator lever 196 pivotally coupled to side walls of pedestal 188 by a pivot pin 198. Lever 196 is normally biased in a switch open position by a spring coiled about pivot pin 198 and having one of its terminal ends engaged in a notch in lever 196 and its opposite terminal end in bearing engagement with an interior wall surface of pedestal 188. In this position, the lower end of the longer portion of lever 196 engages switch arm 194 but does not depress it to the point of actuating switch 193. The upper shorter arm of lever 196 extends laterally within pedestal 188 with its top horizontal edge in facing relation to the interior of the hollow actuator cap 140.

Pivotally mounted in actuator cap 140 is a sequential actuator 202 that is operatively positioned with respect to lever 196 and the camera latch lever 22 when actuator cap 140 is pushed into its operative position. Sequential actuator 202 is adapted to be operated by the mechanical plunger end 203 of the cable release 143 threaded into hole 142.

Actuator 202 is preferably a sheet metal part of unitary construction that includes an elongated upper arm 204 having a pair of longitudinally spaced depending flanges 206 thereon through which pins 208 on interior walls of cap 140 pass to pivotally mount actuator 202 within cap 140. The left end (as viewed in FIG. 8) of arm 204 terminates in an integrally formed cup section 210 for receiving cable release plunger 203. It will be noted that the bottom portion of cup 210 is positioned directly over latch lever 22 when cap 140 is at its operative position. The opposite end of arm 204 is bent downwardly into a depending transition section which leads to a short horizontal lower arm 212 which terminates in a turned down flange 214 that is positioned to engage the shorter arm of lever 196 to the left of pivot pin 198.

As noted earlier, in the manual mode of operation the camera 16 is to be actuated to initiate a cycle of operation and at some point during the exposure phase when the shutter is open, latch lever 22 is to be depressed to disconnect the battery 44 to suspend the exposure phase until the battery is reconnected.

The switch 193 forms part of a later-to-be-described adapter circuit that will be connected to camera 16 through the cable release assembly 88 plugged into camera socket 40 for actuating camera 16 when switch 193 is closed. Therefore, in the manual mode, switch 193 is to be closed first and then latch lever 20 is to be pivoted to disconnect the battery.

To operate adapter 10 in the manual mode, the operator attaches a cable release assembly 143 to the actuator cap 140 and pushes it inwardly to its operative position shown in FIG. 8. In response to manual depression of the actuator button on the cable release, plunger 203 moves downwardly and its engagement with cup 210 causes sequential actuator 202 to pivot in a counterclockwise manner about pivot pins 208. The lower end 214 of actuator 202 pivots downwardly against the short arm of lever 196 causing lever 196 to pivot in a counterclockwise manner about pin 198. This pivotal movement causes the lower end of lever 196 to pivot switch arm 194 downwardly against button 195 to cause actuation of switch 193. After switch 193 is closed, further downward movement of plunger 203 causes the underside of cup 210 to engage the top of latch lever 22 and move it downwardly to a position where switch 52 opens to disconnect the battery 44 from the camera power and logic circuit 46. The operator holds the cable release down for the required exposure time.

Upon manual release of assembly 143, the plunger 203 retracts upwardly and the actuator 202 and lever 196 return to their normal position under the influence of biasing spring 200. The sequence of operations is reversed and the latch lever 22 closes to reconnect the battery 44 before switch 193 is opened. In response to opening of switch 193, the later-to-be-described adapter circuit causes the LED 98 in front of the camera photocell window 34 to be energized. The light sensing circuit 48 of camera 16 integrates the emitted light from LED 98 and provides the exposure termination signal for closing the camera shutter. The camera then proceeds normally through the rest of its preprogrammed cycle of operation.

The electronic circuits for operating adapter 10 are shown generally at 216 in FIG. 3 in functional block diagram form.

As noted earlier, adapter 10 is designed to operate in an automatic mode for measuring the intensity level of the image forming light transmitted along the optical path from the microscope eyepiece to the camera lens 30 and storing the measured level in electronic data form; for evaluating the measured intensity level to determine if the exposure interval will be in the predetermined design range of 100 milliseconds to 12.5 seconds; for actuating camera 16 if the measured intensity is in the predetermined range; and for inhibiting actuation of camera 16 if the intensity level is not within the predetermined range and also providing a visual indication to the user that the intensity level is either too high or too low. In those instances when the microscope illumination system will not provide enough light to make an exposure in less than 18 seconds, adapter 10 may be operated in the manual mode during which the automatic cycle of camera 16 is suspended for a time to increase the exposure interval.

With the camera 16 located at its operative position in adapter 10, the cable release assembly 88 is plugged into the camera cable release socket 40. This provides the electrical connection between camera 16 and a CAMERA ACTUATOR CIRCUIT 218 that includes an electronic switch which is operative to electrically connect the terminals of socket 40 to initiate a cycle of operation of camera 16. Also, the photocell LED 98 is positioned in front of the camera photocell window 34 and is energized upon actuation of a PHOTOCELL LED POWER AND LOGIC CIRCUIT 220 for transmitting light to the camera's photocell thereby causing EXPOSURE CONTROL CIRCUIT 48 to produce an exposure termination signal.

In the automatic mode of operation, the user manually depresses start button 80 on control panel 78 to actuate an AUTO-CYCLE START CIRCUIT 222. Circuit 222 provides a first output signal at terminal A which turns on an EXPOSURE CONTROL POWER AND LOGIC CIRCUIT 224 and a second control signal at terminal B that turns off an INDICATOR LED POWER AND LOGIC CIRCUIT 226.

Circuit 224 provides power and control logic for the self-contained exposure control system within adapter 10.

Circuit 226 supplies power to LED 81 or LED 82 when it is turned on by an input signal to terminal L (indicating too little light for proper exposure) or terminal H (indicating too much light for proper exposure). Circuit 222 provides the turnoff signal to circuit 226 at the beginning of each auto-cycle to turn off power to LED 81 or 82 if circuit 226 had been turned on during the preceding cycle of operation of adapter 10.

Upon actuation by circuit 222, circuit 224 provides an output signal that turns on the shutter solenoid 172 causing the shutter blade with photocell 94 thereon to move from its unblocking position to its blocking position in the optical path along which the image forming light is transmitted. Circuit 224 maintains solenoid 172 in its energized state until the solenoid 172 is turned off by a control input signal supplied at a solenoid off terminal or circuit 224 is turned off by an input signal to its off-reset terminal.

The photocell 94 forms part of an ADAPTER LIGHT INTEGRATOR CIRCUIT 228 that is actuated by the output signal of circuit 224 after a suitable delay provided by DELAY CIRCUIT 230. This delay is of a duration to allow the shutter blade 96 to pivot from its unblocking position to its blocking position to locate photocell 94 in the optical path.

During the measuring interval, LIGHT INTEGRATOR CIRCUIT 228 integrates the current from photocell 94 and provides an output signal to a conventional comparator 232. A REFERENCE VOLTAGE CIRCUIT 234 including a potentiometer 236 that is operated by the lighten/darken or trim control wheel 84 on control panel 78 provides a reference voltage level input to comparator 232. When the voltage input from LIGHT INTEGRATOR CIRCUIT 228 reaches the reference voltage, comparator 232 provides a trigger output signal to terminal T of a later-to-be-described EXPOSURE WINDOW TIMER AND GATE CIRCUIT 238. While some prior art systems designed to measure scene light before exposure utilize a sample and hold circuit wherein a capacitor is charged to a voltage that is proportional to measure light intensity, it is preferable to utilize the LIGHT INTEGRATOR CIRCUIT 228 in this application because the range of light intensity values is so wide. Those having skill in the electronic art will appreciate that integrating current from the photocell 94 will provide a more accurate measurement than trying to guage intensity by reading the voltage level of a capacitor especially at low light levels where the signal-to-noise ratio will be troublesome.

The output signal from DELAY CIRCUIT 230 that actuates LIGHT INTEGRATOR CIRCUIT 228 is also fed and serves as the input signal to a DUAL RATE CLOCK CIRCUIT 240; an UP/DOWN COUNTER CIRCUIT 242 and the previously noted EXPOSURE WINDOW CIRCUIT 238.

The counter 242 is utilized as a memory device for electronically storing the measured intensity level data. When LIGHT INTEGRATOR CIRCUIT 222 is actuated, counter 242 starts to count up in response to an input signal to input terminal A. At the end of the light integration period, indicated by the provision of the trigger signal from comparator 232, an input signal is provided to input terminal B of counter 242 to stop the upward count. The number in the counter 242 represents the time of the light integrating period and is in turn proportional to light intensity. During the film exposure phase, to be described later, the counter 242 will count down to 0 and provide an output signal at terminal C which is fed to terminal A of the photocell LED POWER AND LOGIC CIRCUIT 220 to energize LED 98 and thereby terminate exposure.

The rate at which counter 242 counts is set by clock 240.

It is obvious that the clock and counter combination must operate on a real time base when counting down (within a range of 100 milliseconds to 12.5 seconds) to set the actual exposure interval. However, when counting up to store the intensity level data, there is no such constraint and, advantageously, the system is configured to operate on an accelerated time basis during the count up phase to avoid long light measuring intervals. Accordingly, clock 240 is of the dual rate type that is configured to operate at either a "fast" rate or a slow (real time) rate. In a preferred embodiment, the fast rate is 8 times greater than the real time rate. This particular scale factor was chosen because it is convenient to incorporate into the binary coded circuitry of clock 240. However, any other suitable scale factor may be used. Also a variable scale factor circuit may be used to conform to different film speeds.

Thus when clock 240 is provided with an input signal at terminal F it provides fast rate clock pulses at terminal A that are fed into the fast input terminal F of counter 242. When an input signal is provided at terminal S of clock 240, it shifts from the fast rate to the real time rate and provides real time clock pulses at output terminal B which are fed into an input terminal S of counter 242.

Likewise, the LIGHT INTEGRATOR CIRCUIT 228 is designed to operate on the accelerated rather than the real time base. Thus, when subjected to a light intensity that corresponds to an exposure of 100 milliseconds, the output of INTEGRATOR CIRCUIT 228 will reach the referenced voltage level in 12.5 milliseconds. Applying the same 8 times scale factor to the longest exposure in the predetermined range (12.5 seconds), the output of the INTEGRATOR CIRCUIT 222 will reach the reference voltage in 1.56 seconds. Thus if the trigger signal from comparator 232 is provided within an exposure "time window" between 12.5 milliseconds and 1.56 seconds, indicating that the measured light intensity is within the predetermined range of exposure values compatible with the exposure parameters of camera 16 and the film used therein, then the adapter system will actuate camera 16 to initiate its preprogrammed cycle of operation. If the trigger signal from comparator 232 occurs sooner than 12.5 milliseconds after initiation of light integration or it occurs later than 1.56 seconds thereafter, the adapter system will inhibit camera actuation and cause the appropriate one of the indicator LEDs 81 and 82 to be energized. The control means for providing this function includes the previously noted EXPOSURE WINDOW TIMER AND GATE CIRCUIT 238.

Circuit 238 includes an internal real time clock which is turned on simultaneously with the beginning of the light integration phase by the output signal from DELAY CIRCUIT 230. If the trigger signal from comparator 232 is applied to terminal T of circuit 238 within the 12.5 milliseconds to 1.56 second exposure window time frame, then circuit 238 will provide an output signal at terminal A which is fed to the input terminal A of CAMERA ACTUATOR CIRCUIT 218 to effect the actuation of camera 16.

If, however, the input signal to terminal T occurs prior to the lower 12.5 millisecond limit, as measured by the self-contained clock, then the output signal at terminal A will be inhibited and, instead, an output signal will be provided at terminal H. This signal is fed to the input terminal H of INDICATOR LED CIRCUIT 226 thereby turning it on. In response to such actuation, circuit 226 energizes LED 82 indicating to the user that there is too much light for proper exposure.

If the trigger signal from COMPARATOR CIRCUIT 232 has not been received at terminal T of circuit 238 at the end of the 1.56 second upper limit, circuit 238 will automatically provide an output signal at terminal L that is fed to input terminal L on INDICATOR LED CIRCUIT 226 thereby turning it on and effecting the energization of LED 81 indicating there is too little light available for proper exposure. Also, circuit 238 will inhibit the provision of the output signal from terminal A when the comparator output is supplied to terminal T after 1.56 seconds.

The output signals from terminals H and L of circuit 238 are also fed through an OR GATE 244 which provide an output signal that is fed to an off reset terminal of circuit 224. This signal resets and deenergizes the adapter exposure control system.

As noted earlier, when the measured intensity level is within the predetermined range, circuit 238 provides an output signal at terminal A which is fed to the input terminal A of camera actuator circuit 218 for initiating the preprogrammed cycle of camera operation. Also, it will be remembered that it is desirable to delay the start of the actual film exposure phase until vibrations induced by movement of the camera reflex member have subsided. This delay is inserted by maintaining the shutter blade 96 in blocking relation to lens 30 for a period of approximately 2 seconds after the reflex member has pivoted to the exposure position. To accomplish this, the output signal from terminal A of circuit 238 is fed to a DELAY CIRCUIT 246 which, after a 2 second interval, provides an output signal that turns off power to solenoid 172. Upon deenergization, the solenoid plunger 184 retracts causing the shutter blade 96 to pivot from its blocking position to its unblocking position. This admits light through lens 30 to initiate the exposure phase.

The output signal from terminal A of circuit 238 is also fed to terminal B of counter 242 and terminal S of clock 240. The input to terminal S switches clock 240 to its real time rate and it provides the appropriate clock pulses from terminal B to counter terminal S. The input signal to terminal B of counter 242 performs two functions. First, it stops the upward count. Then, after a delay equivalent to that provided by DELAY CIRCUIT 246, it initiates the downward count.

As noted above, the actual exposure begins when the shutter blade 96 is pivoted out of blocking relation with lens 30. While the solenoid 172 is capable of pivoting blade 96 very quickly, it does take some finite time for the blade to be moved out of the image forming light path. When the real time exposure is relatively short, the time period to completely uncover the lens may be significant. For longer exposure periods, however, the unblocking time is insignificant.

In a preferred embodiment, the adapter's exposure control system is configured to make the real time exposure interval just a little longer than the exposure interval measured by the light integrator circuit 228 to compensate for the slight delay in unblocking lens 30. This is accomplished by presetting the counter 242 with a preliminary count to which the count based on light integration is added. In other words, instead of starting at 0 to count up, counter 242 is preset at some number corresponding to the time it will take to pivot the shutter blade 96 out of the light path. The count provided by the light integration phase will be added to this preliminary setting. Thus, when counter 242 counts down to set the actual exposure interval, it will be just a bit longer than measured by the light integrator circuit 228 to allow for the complete retraction of blade 96. As shown in FIG. 3, a COUNT PRESET CIRCUIT 248 is provided for supplying an output signal to input terminal P of counter 242 to insert the preset number into counter 242 at the beginning of every up counting cycle.

During the exposure phase, counter 242 counts down until it reaches 0 causing the output signal to be provided at terminal C. As noted earlier, this output signal is fed to input A of the PHOTOCELL LED POWER AND LOGIC CIRCUIT 220 to cause the photocell LED 98 to be energized for effecting exposure termination. This same output from terminal C of counter 242 is also fed to a RESET CIRCUIT 250 which provides an output for resetting the adapter's exposure control system for the next cycle of operation.

For making time exposures in excess of 12.5 seconds, adapter 10 is operated in its manual mode. As shown in FIG. 3, the adapter system 216 includes a MANUAL MODE POWER AND LOGIC CIRCUIT 252 that is actuated when switch 193 on the manual mode switching device 83 is moved to its closed position. Circuit 252 serves to power and control selected circuits including CAMERA ACTUATOR CIRCUIT 218 and the PHOTOCELL LED POWER AND LOGIC CIRCUIT 220.

In response to the closure of switch 193 circuit 252 provides an output signal which is fed to an input terminal M of camera actuator circuit 218. In response to this input signal, the electronic switch in circuit 218 becomes conductive causing camera 16 to be actuated. The reflex member moves to its exposure position and the camera shutter opens to initiate the film exposure phase. Thereafter, the latch lever 22 is pivoted upwardly causing battery 44 to be disconnected from the camera circuits to suspend the cycle of camera operation. At the end of the desired exposure interval, the latch lever 22 is lowered to reconnect the battery and then switch 193 is reopened. In response to opening switch 193 the input signal to terminal M of circuit 218 is terminated. This causes circuit 218 to provide an output signal at terminal P which is fed to input terminal M of circuit 220. In response to this input signal, circuit 220 energizes the photocell LED 98 to effect exposure termination. The input signal terminal M is automatically terminated after a time interval sufficient for the camera light sensing circuit to integrate the light output of LED 98. The manual mode system is then automatically reset and deenergized.

In use, the operator adjusts lens 30 to its closest focus setting (10.4") using focus wheel 32 and while viewing the image through viewfinder 42 adjusts microscope 14 for sharp focus. It is also preferred that the filter wheel 36 be set to present the lightest portion of th neutral density filter in front of the camera photocell to minimize the response time of the light integrating circuit to the transmission of light from the photocell LED 98 on the adapter 10. Accordingly, the circuits used in adapter 10 are designed to be compatible with the automatic exposure control system of camera 16 when the filter wheel 36 is set in this position.

After focusing, the operator manually depresses the auto/start button 80 on control panel 78. In response to closure of switch 80, circuit 222 turns on circuit 224 and turns off circuit 226 if necessary.

Circuit 224 energizes solenoid 172 causing the shutter blade 96 to move to its blocking position and locating photocell 94 thereon in the optical path of the image forming light emanating from microscope 14. Following the delay provided by circuit 230, the light integrator circuit 228, clock 240, counter 242 and EXPOSURE WINDOW TIMER AND GATE CIRCUIT 238 are actuated. This sequence sets clock 240 in its fast rate mode and counter 242 begins to count upward from the preset number provided by circuit 248. Also, circuit 238 begins to time the "exposure window".

If the microscope illumination system is providing too much light, LIGHT INTEGRATOR CIRCUIT 228 will reach the reference voltage level prior to 12.5 milliseconds causing the COMPARATOR CIRCUIT 232 to provide its output at terminal T of circuit 238 before the window is opened. Accordingly, circuit 238 will inhibit the output at terminal A and provide an output at terminal H. Thus camera operation is inhibited and the output signal from terminal H of circuit 238 is fed to the input terminal H of circuit 226 causing the LED 82 to be energized. This same signal is also fed through OR gate 244 to the off/reset terminal of circuit 224 thereby causing the exposure system to be reset and then deenergized.

The energized LED 82 indicates to the user that there is too much illumination for proper exposure. The operator then reduces the illumination and commences another automatic cycle by manually depressing button 80.

If the illumination has been reduced so that it falls within the predetermined range of exposure values, the system will react accordingly. When the output signal from comparator 232 is provided at terminal T of circuit 238 within the "exposure window", circuit 238 will provide the output at terminal A to effect camera actuation through circuit 218. This signal will also be provided at terminal B of counter 242 to stop the upward count and at terminal S of clock 240 to switch it from its fast rate to its slow or real time rate. After the camera reflex member is pivoted up and the vibrations have subsided, delay circuit 246 deenergizes solenoid 172 causing shutter blade 96 to pivot to its unblocking position. At this time, the signal from terminal A of circuit 238 to terminal B of counter 242 causes the counter to start counting down at the real time rate. When the counter reaches 0, the output is provided from counter terminal C to terminal A of the PHOTOCELL LED POWER AND LOGIC CIRCUIT 220 for energizing LED 98 to terminate exposure. The signal is also provided to the RESET CIRCUIT 250 to reset the adapter system.

It will be noted that when the second cycle was started by pressing button 80, AUTO CYCLE START CIRCUIT 222 turned off circuit 226 to deenergize the LED 82 that was energized during the previous cycle of adapter operation.

If, however, when the operator was adjusting the microscope illumination he turned it down to the point where there was insufficient illumination for proper exposure, the second cycle would have resulted in inhibiting the actuation of camera 16 and the energization of the LED 81. The operator then can suitably increase the illumination and initiate another automatic cycle of operation. It the light level is proper, the film will be exposed. If not, the operator will be provided with an indication of the light level deficiency without having to waste a film unit.

If attempts to increase illumination fail to produce actuation of camera 16, the operator then knows that he must use the manual mode for a time exposure exceeding 18 seconds. He then proceeds with manual mode operation as previously explained.

The circuits outlined in FIG. 3 are merely exemplary of one way to effect operation of adapter 10 in the functional sequence set forth herein.

There are many other ways to accomplish the same functional sequence with other circuits or components. For example, in an alternative embodiment, it may be desirable to maintain the photocell LED 98 in its energized condition when adapter 10 is plugged into a wall socket. In this embodiment, circuitry would be provided to turn off LED 98 when cycle start button 80 is first depressed and then turn it on at the proper time in response to an output signal from terminal C from counter 242 or from terminal T of CAMERA ACTUATOR CIRCUIT 218.

Because certain changes may be made in the above adapter without departing from the scope of the invention herein involved, it is intended that all matter contained in the above description or shown in the accompanying drawings shall be interpreted as illustrative and not in a limiting sense.

What is claimed is:

1. An adapter for coupling a camera to an optical instrument in position to photograph an image provided by the instrument, the camera being of the type which upon actuation proceeds through an automatic cyle of operation including a film exposure phase that is automatically controlled within a predetermined range of exposure values by a light sensing circuit, formed in part by a camera mounted photocell, providing an exposure termination signal when a predetermined quantity of scene light has impinged upon the photocell following exposure initiation, said adapter comprising:

an adapter body for receiving and supporting such a camera thereon and including means for coupling said adapter body to the instrument so that the camera's objective lens is in position to receive image forming light transmitted along an optical path from the instrument;

means for blocking transmission of ambient and said image forming light to the camera photocell;

a light source operative upon energization for transmitting a sufficient quantity of light to the camera photocell for the light sensing circuit to provide the exposure termination signal;

means for measuring the intensity level of the image forming light and for providing a trigger signal at the end of an interval that is proportional to the measured intensity level;

means for storing the measured light intensity data; and control means responsive to said trigger signal when provided within a predetermined range of timed intervals that corresponds to said predetermined range of exposure values for actuating said camera and responsive to said storing means for thereafter energizing said light source at a time following exposure initiation that is proportional to the measured intensity level, said control means also including means for inhibiting camera actuation when said trigger signal is provided at times not within said predetermined range of timed intervals.

2. The adapter of claim 1 further including a shutter mounted on said adapter body and including a shutter blade movable between an unblocking position wherein said blade is out of said optical path allowing transmission of image forming light to the camera objective lens and a blocking position wherein said blade is located in said optical path for blocking transmission of image forming light to the objective lens and means for selectively driving said blade between said unblocking and blocking positions, and said intensity level measuring means includes a photocell mounted on said blade in facing relation to said instrument so that said photocell is located at an operative position in said optical path for effecting light measurement when said blade is in said blocking position.

3. The adapter of claim 2 wherein said camera is of the reflex type including a reflex member that is automatically moved from a viewing position to an exposure position before exposure initiation, said adapter further includes a manually operable actuator for actuating an automatic cycle of adapter operation, said drive means is responsive to operation of said actuator for driving said blade from said unblocking to said blocking position at the beginning of said cycle to effect light measurement and thereafter is responsive to said control means for immediately driving said blade back to said unblocking position when camera actuation is inhibited and for maintaining said blade in said blocking position for a predetermined time following camera actuation to allow vibration induced by such movement of the reflex member to subside before driving said blade back to said unblocking position to initiate film exposure.

4. The adapter of claim 1 further including visual indicator means responsive to said control means when said control means inhibits camera actuation for warning the operator that the measured intensity level is too high or too low for proper exposure.

5. The adapter of claim 4 wherein said visual indicator means includes a first light source for indicating the measured intensity level is too low and a second light source for indicating the measured intensity level is too high, said control means provides a first control signal when the measured intensity level is too low and a second control signal when the measured intensity level is too high and said adapter further includes means responsive to said first control signal for energizing said first light source and responsive to said second control signal for energizing said second light source.

6. The adapter of claim 1 wherein said storing means includes an up/down counter operative in an ascending count mode for storing a count number that is proportional to the exposure interval as determined by the measured intensity level and operative in a descending count mode following camera actuation for setting the actual exposure interval based on said stored count number.

7. The adapter of claim 6 wherein said counter operates on a real time base in said descending count mode and operates at a fast rate that is faster than real time in said ascending count mode.

8. The adapter of claim 7 including a dual rate clock for driving said counter, said clock being operable at said fast rate for said ascending count mode of operation and at said real time rate for said descending count mode of operation.

9. The adapter of claim 8 wherein said clock is initially set at said fast rate at the beginning to an adapter cycle of operation and is switched to said real time rate in response to said control means effecting camera actuation.

10. The adapter of claim 6 including means responsive to said counter reaching zero in said descending count mode for energizing said light source associated with the camera photocell to initiate exposure termination.

11. The adapter of claim 6 further including a shutter having a shutter blade that is initially positioned in blocking relation to the camera objective lens at the beginning of an adapter cycle of operation and is moved to an unblocking position, during a finite period following camera actuation, to initiate film exposure, and said adapter also includes means for presetting said counter to an initial count number that is proportional to said finite period and to which a count number proportional to the exposure interval is added during ascending count mode of operation for extending the actual exposure interval during descending count mode operation to compensate for such shutter blade movement.

12. The adapter of claim 1 wherein said measuring and trigger signal providing means includes a light integrating circuit, formed in part by a photocell that is locatable in said optical path, for providing an output signal of a predetermined voltage at a time that is proportional to the measured intensity level, a reference voltage circuit providing an output signal at said predetermined voltage and a comparator circuit for comparing the output signals of said light integrating a reference voltage circuits and providing said trigger signal when said output signals are equal and said storing means includes a counter circuit operable in an ascending count mode for initiating an upward count upon actuation of said light integrating circuit and terminating said count upon provision of said trigger signal to said control means to thereby store a count number therein that is proportional to an exposure time determined by the measured intensity level, said counting circuit thereafter being operable in a descending count mode for setting the actual exposure interval, following camera actuation, based on said previously stored count number.

13. The adapter of claim 12 wherein said counter circuit is operated on a real time basis during said descending count mode and said light integrating and counter circuits are configured to operate at a fast rate that is faster than real time during light integration and the accompanying ascending count mode of operation of said counter circuit.

14. The adapter of claim 13 including a dual rate clock circuit for driving said counter circuit, said clock circuit being set to operate at said fast rate during light integration and thereafter being switched to said real time rate by an output signal from said control means in response to provision of said trigger signal thereto.

15. The adapter of claim 12 wherein said control means includes an exposure window and gate circuit having a timing network therein which is actuated upon initiation of light integration and said window and gate circuit provides an output signal for effecting camera actuation in response to provision of said trigger signal if said trigger signal is received between a minimum time period and a maximum time period as determined by said timing network and inhibits provision of said camera actuating output signal if said trigger signal is provided before said minimum time period or after said maximum time period.

16. The adapter of claim 1 wherein said stored intensity level data represents said interval that is proportional to the measured light intensity level, said interval is proportional to but smaller, by a known factor, than the corresponding proper exposure interval, and said adapter includes means for multiplying said data by said known factor to set the actual exposure interval on a real time basis.

17. The adapter of claim 1 wherein the camera is of the type including a latch lever that is operable when moved from a latching position to an unlatching position for electrically disconnecting a battery from the camera's operating circuits and said adapter includes means for operating said adapter in a manual mode, said operating means including a camera actuating circuit having a normally open switch that effects camera actuation when closed, a pivotally mounted switch actuator movable between an inoperative first position and an operative second position where it closes said switch and a manually operable sequential actuator movable between an inoperative first position, an operative second position wherein it moves said switch actuator from its said first to its said second position, and an operative third position beyond said second position wherein said sequential actuator moves said latch lever from its latching position to its unlatching position to thereby actuate said camera and then disconnect said battery to suspend the automatic cycle of camera operation during the exposure phase, said sequential actuator also being mounted on said adapter body for sliding movement between an inoperative retracted position wherein it is spaced from said latch lever to facilitate camera insertion and removal from said receiving and supporting means and an extended operative position for locating said sequential actuator in proximity to said latch lever.

* * * * *